US010732380B2

United States Patent
(12) Brock et al.

(10) Patent No.: US 10,732,380 B2
(45) Date of Patent: Aug. 4, 2020

(54) SWIPE SCANNING FOR VARIABLE FOCUS IMAGING SYSTEMS

(71) Applicant: Zebra Technologies Corporation, Lincolnshire, IL (US)

(72) Inventors: Christopher W. Brock, Manorville, NY (US); Vladimir Gurevich, Great Neck, NY (US); David P. Goren, Smithtown, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/229,698

(22) Filed: Dec. 21, 2018

(65) Prior Publication Data

US 2020/0200996 A1 Jun. 25, 2020

(51) Int. Cl.

*G06K 7/10* (2006.01)
*G06K 7/14* (2006.01)
*G02B 7/38* (2006.01)
*G02B 7/09* (2006.01)

(52) U.S. Cl.

CPC ................ *G02B 7/38* (2013.01); *G02B 7/09* (2013.01); *G06K 7/10722* (2013.01); *G06K 7/10881* (2013.01); *G06K 7/1413* (2013.01); *G06K 2007/10524* (2013.01)

(58) Field of Classification Search

CPC .................................. G06K 7/00; G06K 7/08

USPC ................................ 235/451, 439, 375, 435

See application file for complete search history.

(56) References Cited

U.S. PATENT DOCUMENTS

2003/0019934 A1* 1/2003 Hunter .............. G06K 7/10584 235/462.2

2009/0224052 A1* 9/2009 Liou ................. G06K 7/10722 235/462.41

2010/0276493 A1* 11/2010 Havens .................... G02B 3/14 235/470

2013/0161399 A1* 6/2013 He ..................... G06K 7/10722 235/462.41

2016/0188930 A1* 6/2016 Zumsteg ........... G06K 7/10366 235/451

* cited by examiner

*Primary Examiner* — Edwyn Labaze

(74) *Attorney, Agent, or Firm* — Yuri Astvatsaturov

(57) ABSTRACT

An imaging reader includes a light source generating an illumination beam over a working distance, and a variable focus imaging assembly with an image sensor, a variable focus optical element, a variable focus imaging controller that controls operation of the variable focus optical element to define a plurality of imaging planes over the working distance. The variable focus imaging controller assesses a variety of scanning parameters and determines the number of imaging planes over the working distance and the distance of each of imaging plane from the image sensor, to allow the imaging reader to capture images of a target object only at each of the imaging planes, thereby avoiding time-consuming autofocusing on the target. The imaging reader captures images in a sequential order greatly reducing image capture and image analysis processing time.

20 Claims, 7 Drawing Sheets

152487US01

7/7

SWIPE SCANNING FOR VARIABLE FOCUS IMAGING SYSTEMS

BACKGROUND OF THE INVENTION

Devices such as barcode scanners are used in various inventory applications. In some configurations, these barcode scanners use internal auto-focus cameras to capture images of barcodes and other scannable indicia. While auto-focus camera systems are flexible enough to be used in different applications, there are considerable operational delays as camera systems focus on different objects and different distances. Furthermore, the need for accurate and fast focusing on varied objects adds considerable processing complexity and mechanical componentry to these camera systems, all of which increase costs.

Auto-focus cameras typically have lens apertures much larger than fixed focus systems. As a result, auto-focus cameras are known to have shallower depth of focus for any particular focus setting. For conventional scanning applications, the shallower depth of focus is not a problem as the system focuses on a barcode. In some environments of use, however, in particular the barcode scanning mode termed hands-free operation, there is typically not enough time for a conventional auto-focus camera system to focus fast enough to acquire an image of sufficient image focus quality to allow for accurate decoding of a barcode. In hands-free operation mode, the user or a conveyor system is swiping, dragging, or otherwise moving barcode objects in front of the barcode scanner at very high scan rates, scan rates that are at times (if not often) faster than the auto-focus time of the system. Furthermore, the working distance in a hands-free operation mode can be large, i.e., the distance range between the barcode reader and the plane of the barcode to be scanned can vary greatly from one object to the next. The larger the working distances, the longer it takes for the auto-focus camera system to focus over the entire working distance.

Accordingly, there is a need for focusing imaging capture systems applicable to barcode readers.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
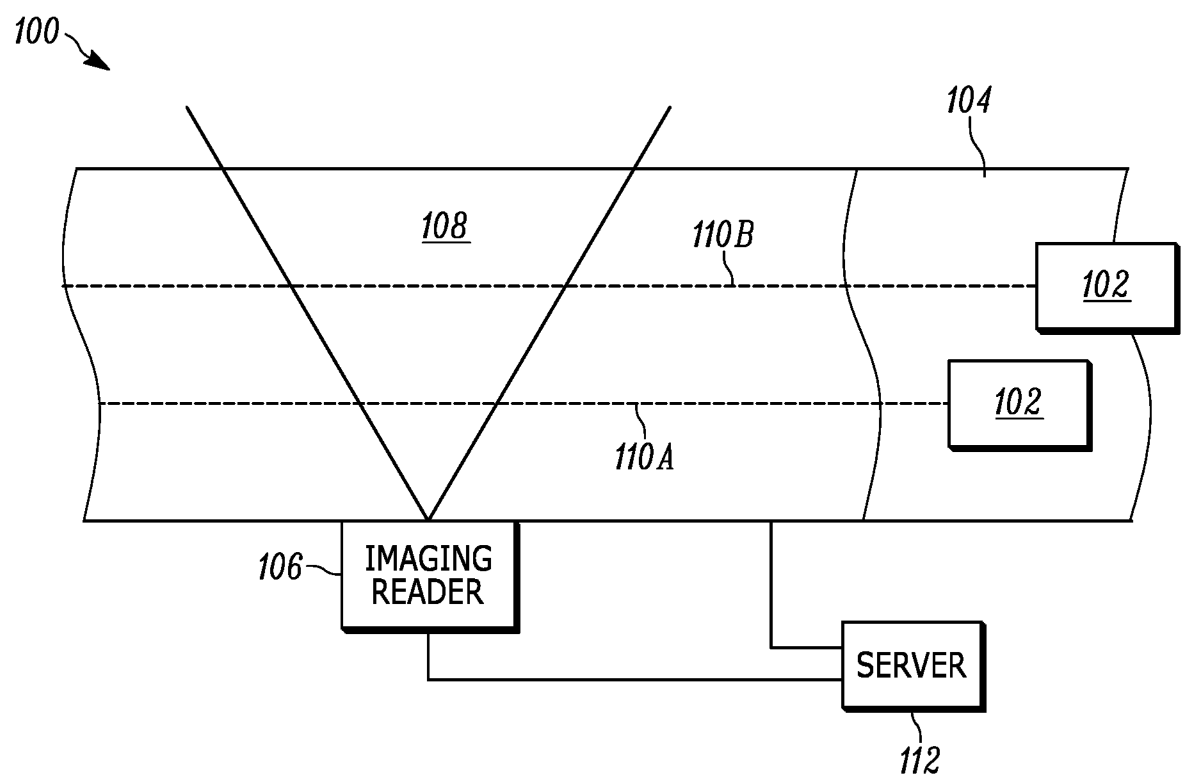
FIG. 1 illustrates a variable focus scanning station, in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In an embodiment, the present invention is an imaging reader. The imaging reader includes a housing; a light source positioned within the housing, the light source to generate an illumination beam for illuminating over a working distance of the imaging reader, the working distance defining a scanning range for imaging a target; and a variable focus imaging assembly positioned within the housing and having an image sensor comprising a plurality of photosensitive elements to capture an image of the target within the working distance, the variable focus imaging assembly further having a variable focus optical element and a variable focus imaging controller to control the variable focus optical element for positioning of a plurality of imaging planes over the working distance. In some examples, the variable focus imaging controller is configured to consecutively cycle the variable focus imaging assembly to focus at each of the imaging planes and capture an image at each of the plurality of imaging planes within the working distance. The imaging reader may be a handheld scanner, hands-free scanner, multi-plane scanner such as a bioptic scanner, or other scanner.

In an embodiment, the variable focus imaging controller is further configured to determine from one or more scanning parameters of the imaging reader at least one of (i) the number of the plurality of imaging planes over the working distance and (ii) a distance of each of the plurality of imaging planes from the image sensor. In an embodiment, the variable focus imaging controller has a hands-free mode in which the variable focus optical element and the image sensor are controlled to capture an image of the target at each of the plurality of imaging planes within the working distance in an ordered manner to form a set of captured images of the target.

Referring now to the drawings, FIG. 1 illustrates an exemplary environment where embodiments of the present invention may be implemented. In the present example, the environment is provided in the form of a scanning station 100 where goods 102 are moved across or along a scanning surface 104 and are scanned by a imaging reader 106 to identify the goods 102. In some embodiments, the scanning station is a point-of-sale (POS) station, which may have a computer system and an interface, not shown, for optically scanning goods and identifying the goods and characteristics of the goods for affecting a transaction. In some embodiments, the scanning station is part of an inventory delivery system, where goods are conveyed by the scanning surface or across the scanning surface to monitor and control delivery of the goods, for example, shipping goods from a facility or receiving shipped goods to a facility.

The scanning surface 104 may be a stationary surface, such that the goods 102 are manually moved relative to the surface 104 or moved by another automated means. In other embodiments, the scanning surface 104 may be a moving surface, such as a surface of a conveyor system. In either case, the goods 102 may be move continuously relative to the imaging reader 106, such that the goods 102 are constantly moving through a working (or scanning) range 108 of the station 100. In some examples, the goods 102 move in a discretized manner, where, at least part of the time the goods 102 are maintained fixed on the surface 104 relative to the imaging reader 106 for a period of time, sufficient to allow one or more images to be captured of the goods 102.

The goods 102 may move along different substantially linear paths 110A, 110B, etc. each path traversing the working range 108 but at a different distance from the imaging reader 106. Indeed, the paths 110A, 110B are for illustration purposes, as the goods 102 may traverse across the surface 104 at any distance from the imaging reader 106.

In some exemplary embodiments, the imaging reader 106 includes a variable focus imaging system, in which the reader 106 continuously scans for an object (such as the goods 102), in its field of view until the object is located and then brought sufficiently into focus on the imaging sensor. With at least some embodiments of the present invention, the imaging reader scans for the object (e.g., goods 102) only at discretized, determined distances, corresponding to imaging planes of the imaging reader 106. Instead of continuous scanning, the imaging reader 106 more quickly captures images at one or more predetermined imagining planes. The imaging planes are defined relative to the imaging reader 106. For illustration purposes, in FIG. 1 imaging planes happen to coincide with paths (e.g., 110A, 110B, etc.) over which the goods 102 traverse. Although, it is more likely the case that the imaging planes will not exactly coincide with the scan path of goods. The imaging reader 106 captures images at each of the imaging planes, where the captured images of the good will vary in focus depending on where the good (and its scan path) is relative to the imaging reader 106. That is the good will appear more in focus at some imaging planes in comparison to others. By capturing images of the goods at only certain imaging planes, the imaging reader 106 is able to identify the goods 102 much faster than a conventional autofocus system. Indeed, the imaging reader 106 can be configured such that if it has an autofocus operation that operation is disabled, and instead images are captured at specific imaging planes irrespective of which scan path the good traverses and without needing to continuously detect the good and autofocus onto the good. This operation greatly reduces power consumption demands on the imaging reader. And, as discussed further herein, the identification and scanning efficiencies can be increased even further by having the imaging reader 106 determine the number and location of the imaging planes based on one or more scanning parameters to minimize the number of imaging planes and the number of captured images of a good, and to minimize time it takes to identify the good, e.g., to identify an indicia or other barcode on the good. At least some of those scanning parameters may be scanning system parameters stored on a server 112 communicatively coupled to the imaging reader 106.

Figure 2:
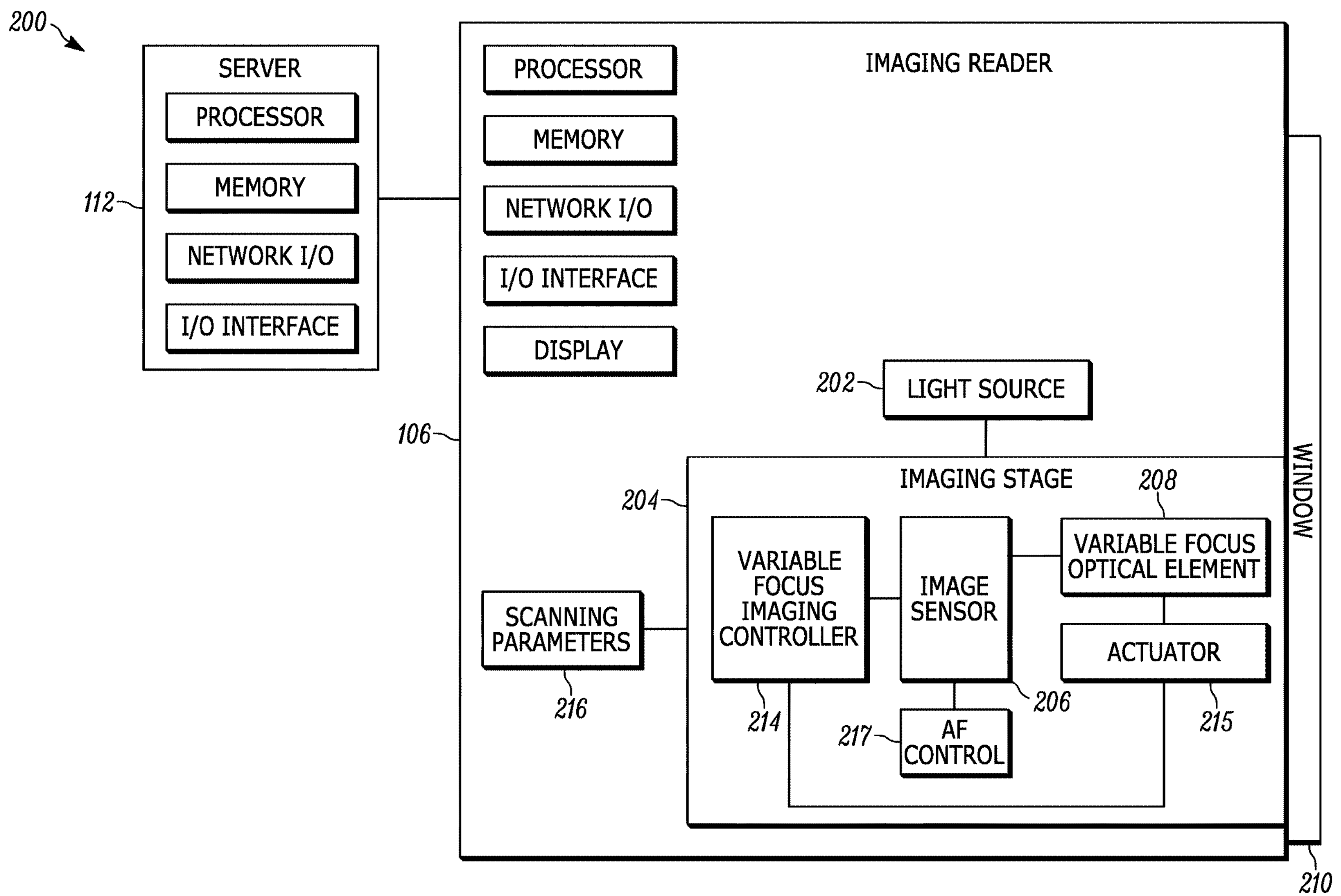
FIG. 2 is an exemplary block diagram schematic of an imaging reader of the variable focus scanning station of FIG. 1, in accordance with an embodiment of the present invention.

As shown in FIG. 2, which illustrates a block connection diagram of an imaging reader 106, the imaging reader 106 may have one or more processors and one or more memories storing computer executable instructions to perform operations associated with the systems and methods as described herein. The imaging reader 106 includes a network input/output (I/O) interface for connecting the reader to the server 112, an inventory management system (not shown), and other imaging readers. These devices may be connected via any suitable communication means, including wired and/or wireless connectivity components that implement one or more communication protocol standards like, for example, TCP/IP, WiFi (802.11b), Bluetooth, Ethernet, or any other suitable communication protocols or standards. The imaging reader 106 further includes a display for providing information such as visual indicators, instructions, data, and images to a user.

In some embodiments, the server 112 (and/or other connected devices) may be located in the same scanning station 100. In other embodiments, server 112 (and/or other connected devices) may be located at a remote location, such as on a cloud-platform or other remote location. In still other embodiments, server 112 (and/or other connected devices) may be formed of a combination of local and cloud-based computers.

Server 112 is configured to execute computer instructions to perform operations associated with the systems and methods as described herein. The server 112 may implement enterprise service software that may include, for example, RESTful (representational state transfer) API services, message queuing service, and event services that may be provided by various platforms or specifications, such as the J2EE specification implemented by any one of the Oracle WebLogic Server platform, the JBoss platform, or the IBM Web Sphere platform, etc. Other technologies or platforms, such as Ruby on Rails, Microsoft .NET, or similar may also be used.

In the illustrated example, the imaging reader 106 includes a light source 202, which may be a visible light source (e.g., a LED emitting at 640 nm) or an infrared light source (e.g., emitting at or about 700 nm, 850 nm, or 940 nm, for example), capable of generating an illumination beam that illuminates the working range 108 for imaging over an entire working distance of that working range 108. That is, the light source 202 is configured to illuminate over at least the entire working range 108. The illumination intensity of the light source 202 and the sensitivity of an imaging reader can determine the further and closest distances (defining the distance of the working range, also termed the scanning range) over which a good can be scanned, and a barcode on the good can be decoded. The light source 202 is controlled by processor and may be a continuous light source, an intermittent light source, or a signal-controlled light source, such as a light source trigged by an object detection system coupled (or formed as part of though not shown) to the imaging reader 106. The light source may be an omnidirectional light source.

The imaging reader 106 further includes an imaging arrangement 204 having an imaging sensor 206 positioned to capture images of an illuminated target within the working range 108. In some embodiments, the imaging sensor 206 is formed of one or more CMOS imaging arrays. A variable focusing optical element 208 is positioned between the imaging sensor 206 and a window 210 of the imaging reader 106. A variable focus imaging controller 214 is coupled to the variable focusing optical element 208 and controls the element 208 to define one only one or more discrete imaging planes for the imaging sensor.

In the illustrated example, the controller 214 is coupled to the variable focusing optical element 208 through an actuator control unit 215 and bypasses an optional autofocus control unit 217, thereby providing faster image capture at the desired imaging planes by overriding the slower autofocus control units of conventional systems. In exemplary embodiments, the imaging reader 106 does not have a autofocus control unit or any autofocus functionality. The actuator 215 may include a focusing lens drive, a shift lens drive, a zoom lens drive, an aperture drive, angular velocity drive, voice coil motor drive, and/or other drive units for controlling operation of the optical element 208, which itself may comprise multiple lens, lens stages, etc.

The variable focusing optical element 208 may be a deformable lens element, in some embodiments. In some embodiments, the optical element includes a voice coil actuator motor in the actuator 215 that is controllably adjusted by the controller 214. In exemplary embodiments, such as some barcode scanning applications, the variable focus optical element 208 has an aperture from 1.5 mm to 3 mm. In some embodiments, the image stage 204 is implemented as part of an variable focus camera assembly.

In exemplary embodiments, the variable focus imaging controller 214 is configured to access one or more scanning parameters 216 stored in the imaging reader 106. From these scanning parameters 216, the controller 214 determines the number of discrete imaging planes at which the imaging reader 106 scans for and captures images of the target (such as goods 102). The controller 214 further determines the distance of each of those imaging planes, as measured from the imaging sensor 206. The controller 214, for example, may determine the number and distance of imaging planes so that the entire working range 108 is covered by five (5) or fewer imaging planes. In some examples, depending on the scanning parameters 216, the number of imaging planes may be three (3) or fewer.

The imaging controller 214 converts these determined imaging planes and distances into parameters or instructions for controlling the actuator 215 for controlling the variable focus optical element 208.

In exemplary embodiments, the variable focus imaging controller 214 has hands-free mode in which the variable focus optical element 208 and the imaging sensor 206 are controlled to capture an image of the target at each of the imaging planes within the working range in an ordered manner to form a set of captured images of the target, stored in the memory. In some embodiments, that ordered manner is a sequential order, such as from nearest imaging plane to farthest or vice versa, as measured from the imaging sensor 206.

Figure 7:
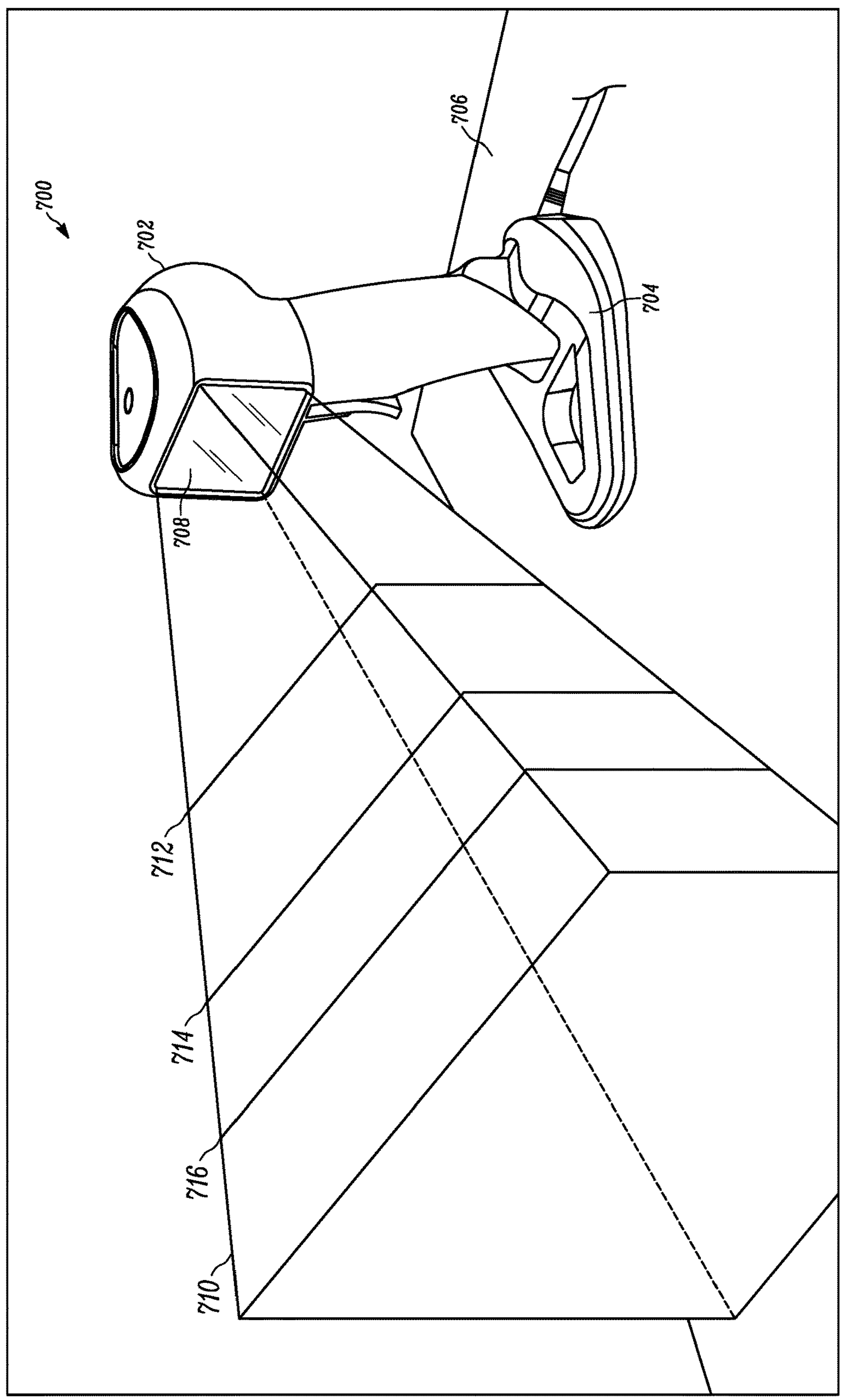
FIG. 7 illustrates a perspective view of another variable focus scanning station, a handheld scanner, with variable determined imaging planes, in accordance with an embodiment of the present invention.

In some exemplary embodiments, the imaging reader 106 is implemented in a handheld bar code scanner device, such as shown in FIG. 7. When the handheld scanner is placed within a stationary cradle thereby establishing an upright scanning position, the handheld scanner may automatically sense that placement and enter the hands-free mode. In other exemplary embodiments, the imaging reader 106 is implemented as a multi-plane scanner, such as a bioptic scanner as shown in FIG. 3.

In exemplary embodiments, the variable focus optical element 208 is discretely controlled to hop to each imaging plane, avoiding a sweeping operation between imaging planes.

In other exemplary embodiments, the variable focus imaging controller 214 is configured to control the imaging stage 204 to capture images, in the hands-free mode, at each of the imaging planes by using a focus sweeping operation on the variable focus optical element 208. Depending on the type of variable focus optical element 208 and in particular the type of motor control mechanism used, the imaging reader 106 may operate even faster using a focus sweeping operation between imaging planes. In the focus sweeping operation, the controller 214 may preset the optical element 208 at one of the determined imaging planes at which an image of the target is captured. The controller 214 then controls the optical element 208 to sweep from that first imaging plane to the next sequential imaging plane in a continuous manner, where an image of the target is captured, and then sweep the optical element 208 to the next imaging plane, and so on, until the last imaging plane is reached and the sweeping stops.

Figure 3:
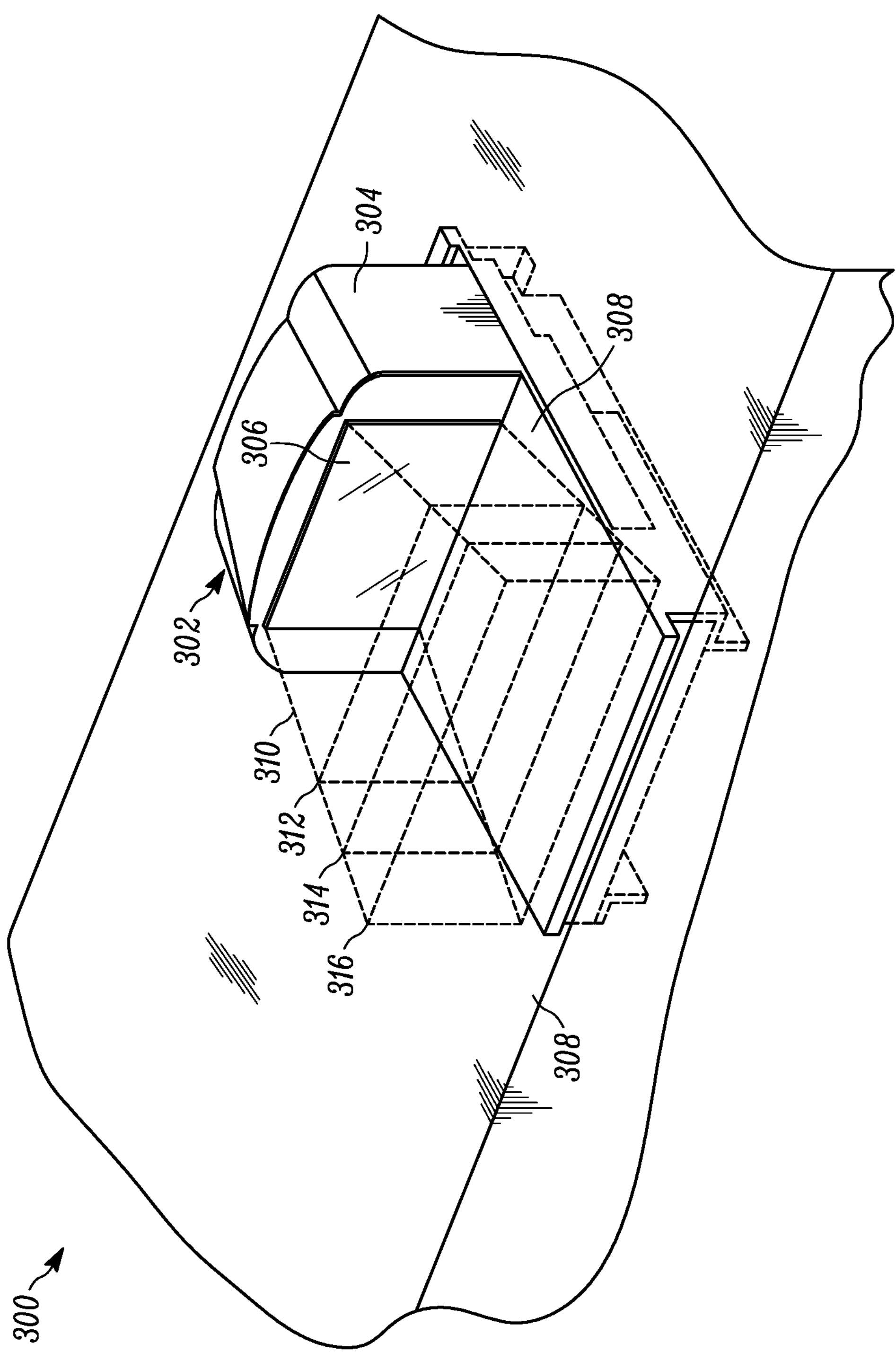
FIG. 3 illustrates a perspective view of another variable focus scanning station with variable determined imaging planes, in accordance with an embodiment of the present invention.

FIG. 3 illustrates an exemplary scanning station 300 having an imaging reader 302, in the form of a bioptic scanner, having a housing 304 and a first scanning window 306 behind which is an illumination source (not shown) and an imaging stage (not shown) like that of FIG. 2. The imaging reader 302 is positioned adjacent a scanning surface 308 and defines a horizontally and vertically extending working range 310 illuminated by the imaging reader 302 and having defined therein 3 imaging planes 312, 314, and 316 at which the imaging reader 302 captures images of an object for identification and imaging.

Figure 4:
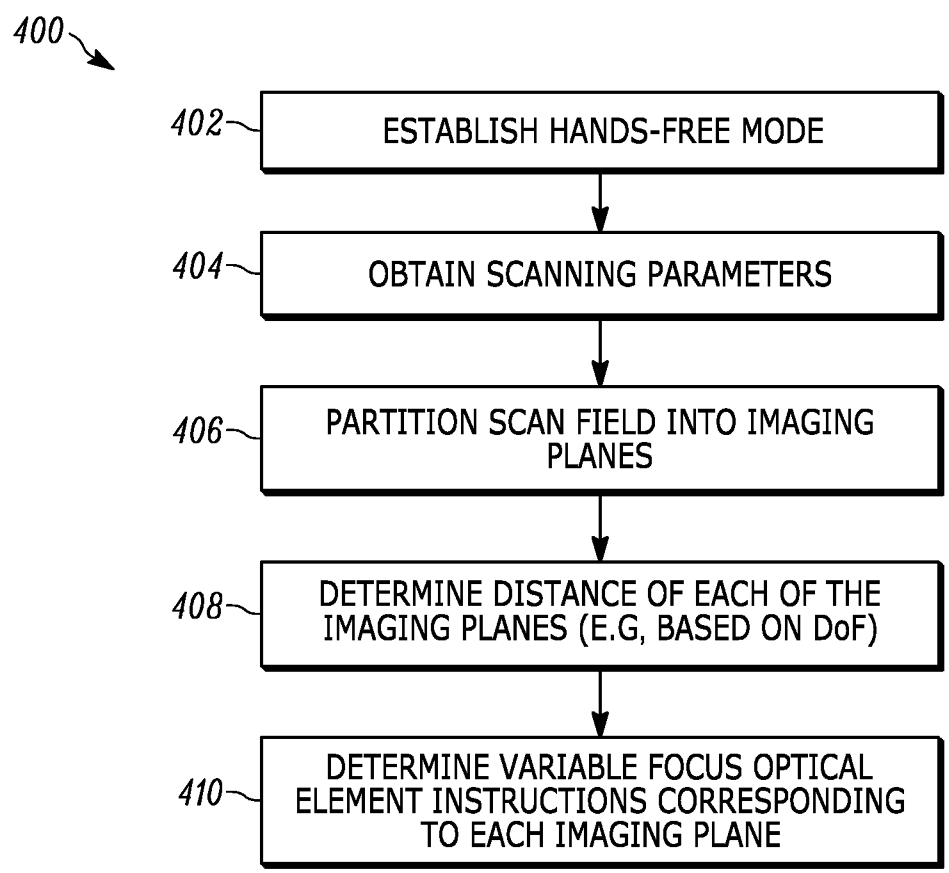
FIG. 4 illustrates a flowchart representative of a method of determining imaging planes for a variable focus scanning station in response to scanning parameters, in accordance with an embodiment of the present invention.

FIG. 4 illustrates a method 400 of performing swipe scanning in accordance with an embodiment of the present invention. The method 400 may be implemented by the imaging reader of any of FIGS. 1-3, for example. In the example of a handheld scanner, initially, the imaging reader enters a hands-free mode at 402 indicating that swipe scanning is to be performed. In some examples, the handheld scanner includes a trigger on or near a handle, and the trigger, when depressed, enters the scanner into the hands-free mode for swipe scanning. The imaging reader obtains scanning parameters at 404.

In exemplary embodiments, the scanning parameters include frame rate of the image sensor of the imaging reader, exposure time of that image sensor, the aperture or aperture range of the variable focus optical element, the swipe speed of movement of the target, a size of the working distance, a nearest distance of the working distance, a farthest distance of the working distance, and/or focusing time of the variable focus optical element. Such parameters may be stored within the imaging reader, for example.

In some embodiments, the scanning parameters are target specific parameters, such as the types and/or sizes of the targets to be scanned. In some embodiments, the scanning parameters include the types of indicia on the targets, such as whether the targets contain 1D or 2D barcodes, QR codes, UPC codes, or other identifying indicia. In some examples, some scanning parameters are obtained from the imaging reader communicating with a server, such as the server 112, which may include an inventory control manager that access information on targets.

The variable focus imaging controller, at 406, assesses the scanning parameters and determines a number of imaging planes at which the imaging reader will capture images of the target during a scan.

In some embodiments, the process 406 determines the number of imaging planes based on the length of the working distance, by establishing a sufficient number of imaging planes to cover that entire length so that whether a target is imaged at a near end of the working distance or a far end, the image of the target will be sufficient in focus to all for desired image processing. The length may be determined from a nearest distance and farthest distance of the working distance, for example. In some embodiments, the process 406 makes the determination by further considering the depth of the field of the variable focus optical element across that length, thereby ensuring that a suitable focus quality is maintained through the working distance wherever the target is imaged. In some embodiments, the process 406 may access the speed by which the target moves across working range. If the target speed is 1/10 the speed of a sweep focusing speed of the variable focus optical element, for example, the process 406 would typically be configured to assign no more than 10 different imaging planes to be scanned, since any greater number and some of the images capture at imaging planes would not capture any portion of the target or they would capture only a portion of the target. Typically, the process 406 would identify no more than 5 imaging planes, and more typically, the number of imaging planes would be 3 or fewer.

Figure 5:
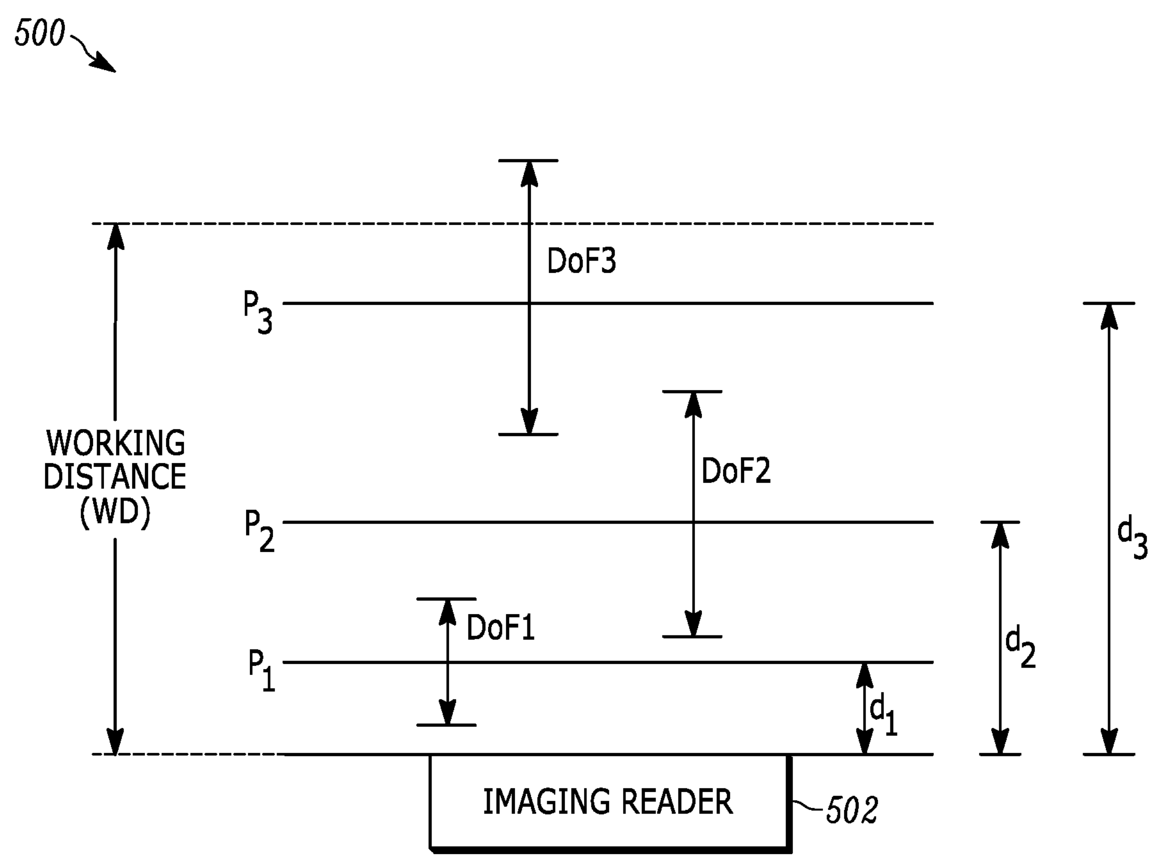
FIG. 5 illustrates a schematic view of the determined image plane distances for an imaging reader, in accordance with an embodiment of the present invention.

At 408, the variable focus imaging controller further determines the distal position of those imaging planes based on one or more of the scanning parameters. For example, based on the aperture or aperture ranges of the variable focus optical element and based on the depth of field at each of the imaging planes, the variable focus imaging controller determines the position of each imaging plane to maximize the coverage within the working range. FIG. 5 illustrates an example scanning station schematic 500 having an imaging reader 502 in accordance with the examples described herein. The process 406 has determined, based on the scanning parameters, that 3 imaging planes (P1, P2, and P3) would be sufficient to cover working range distance, WD. Process 408, assessing the depths of field at different possible locations of the imaging planes, has determined that P1 should be placed at a distance d1, imaging plane P2 at a distance d2, and imaging plane P3 at a distance d3. Each of the distances d1, d2, and d3 are different. Yet, because the depths of field at each location (DoF1, DoF2, DoF3, respectively) differs, collectively be establishing the imaging planes at these three distances from the image sensor, the entire working distance, WD, is sufficiently covered by having the imaging reader capture images at just these three imaging planes. Few or greater numbers of imaging planes may be used and positioned differently based on the depths of field. Depth of field can be determined from formulas for hyperfocal, near distance of acceptable sharpness, and far distance of acceptable sharpness. In exemplary embodiments, the depth of field at the different imaging planes overlaps to provide a more consistent resolution on the captured images. In other examples, one or more of the depths of field may be non-overlapping.

Processes associated with 406 and 408 may be implemented as part of a ranging mode of the imaging reader, where the imaging reader determines the desired scanning conditions before operating in a scanning made where targets swept in front of the imaging reader are scanned. At 410, the variable focus imaging controller determines appropriate controller parameters for controlling the variable focus optical element and imaging sensor to capture images of the target at the imaging planes determine from processes 406 and 408. These controller parameters will vary depending on the type of variable focus optical element and whether a discretized movement from imaging plane to imaging plane is used or whether a focus sweeping operation is used. The discretized movement, i.e., hopping between imaging planes, can occur at faster time periods than it would otherwise take of an imaging reader to focus on an object and capture an image. Whereas, the focus sweeping operation can occur over timeframes slow enough to allow imaging without stopping focusing operation of the imaging reader, and thus still over faster time periods than an autofocusing system. Autofocusing is not performed in the focus sweeping, instead a sufficient amount of focusing will occur from the focus sweeping operation itself. The same imaging reader may be configured to operate in one or both of a discretized mode and a focus sweeping mode, where the reader may choose between the two modes depending on sensor exposure, shutter speed, object swipe speed, required range of focus distances on the image planes, and/or speed of the focus actuator of the reader.

In the example of FIG. 2, these controller parameters may control operation of both the actuator 215 and the variable focus optical element 208. For a variable focus optical element having a voice coil actuator motor, for example, voltage levels, polarity, duty cycle, and voltage starting and stopping points may all be parameters determined by the process 410. In some embodiments, the process 410 determines instructions for the programmable controller of the voice coil actuator motor. For deformable lens elements, the process 410 may determine the deformation parameters that correspond to the different imaging planes, including the parameters for a deformable lens actuator. In some embodiments, the process 410 determines shutter parameters, such as shutter time, for the image sensor during image capture at each of the imaging planes, where the shutter parameters may be the same at each imaging plane, in some examples, and the shutter parameters may be different at each imaging plane, in other examples. The controller parameters may include parameters to control a focusing lens, a shift lens, a zoom lens, a diaphragm, an aperture, angular velocity, voice coil motor drive, shutter, etc., including control parameters that, in some embodiments, allow for bypassing autofocus control units.

Figure 6:
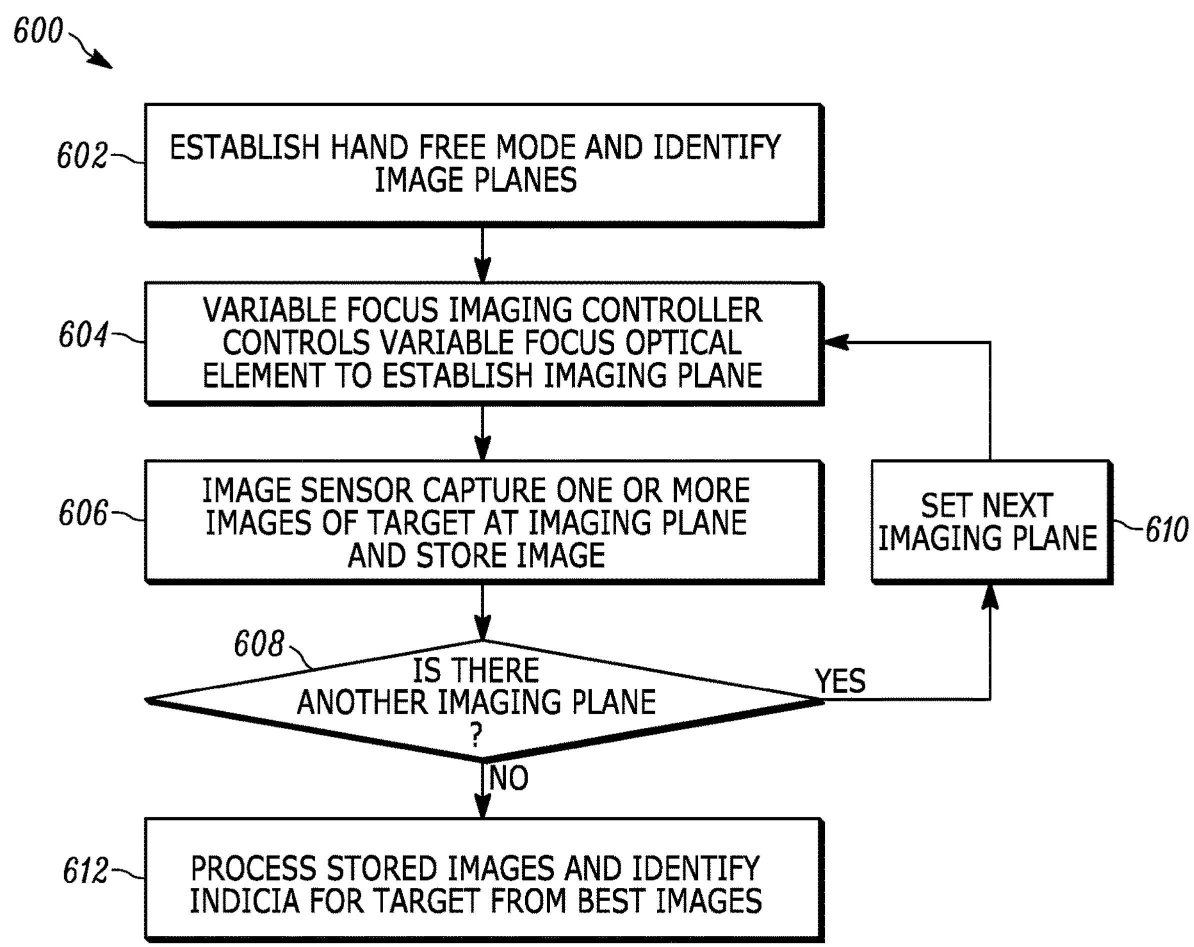
FIG. 6 illustrates a flowchart representative of a capturing images at different determined imaging planes, in accordance with an embodiment of the present invention.

FIG. 6 illustrates a process 600 for capturing images of a target at each of the plurality of imaging planes determined by the process 500. At 602, the hands-free mode is established by the imaging reader and parameters for the imaging planes are identified. The variable focus imaging controller of the imaging reader then controls the optical element to establish the first imaging plane, at 604. The imaging sensor captures one or more images of the target at the first imaging plane, at 606, and the captured images are stored in memory of the imaging reader. If there are additional imaging planes, as determined by the process 608, then the next imaging plane is identified, at 610, and control is returned to the process 602. Otherwise, a process 612 process all the stored images of the target from the different imaging planes to identify an indicia on the target, where that indicia may be communicated to a server, such as an inventory control manager or point of sale processing system, or other device. More generally, the images captured at the imaging planes may be analyzed by any suitable 2D or 3D imaging processing techniques.

FIG. 7 illustrates an exemplary scanning station 700 formed of a handheld scanner 702 and a stationary cradle 704 mounted to a scanning surface 706. The handheld scanner 702 rests in the stationary cradle to establish a hands-free scanning mode, also termed a presentation mode, for scanning objects. The handheld scanner 702 therefor operates as imaging reader, have a scanning window 708, behind which may be an illumination source (not shown) and an imaging stage (not shown) like that of FIG. 2. In the hands-free scanning mode, the handheld scanner 702 defines a horizontally and vertically extending working range 710 illuminated by the imaging reader and having defined therein any number of imaging planes, three of which are shown for example purposes as imaging planes 712, 714, and 716. In accordance with the techniques herein, the handheld scanner 702 captures images of an object for identification and imaging at these three planes. A trigger 718 may be used to initiate a hands-free scanning mode, in some examples. In some examples, the hands-free scanning made is initiative by placement of the scanner 702 into the cradle 704.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An imaging reader comprising:

housing;

a light source positioned within the housing, the light source configured to generate an illumination beam for illuminating over a working distance of the imaging reader, the working distance defining a scanning range for imaging a target; and a variable focus imaging assembly positioned within the housing and having an image sensor comprising a plurality of photosensitive elements to capture an image of the target within the working distance, the variable focus imaging assembly further having a variable focus optical element and a variable focus imaging controller configured to control the variable focus optical element for positioning of a plurality of imaging planes over the working distance, the variable focus optical element having a field of view extending along a central axis;

wherein the variable focus imaging controller is configured to consecutively cycle the variable focus imaging assembly to focus at each of the imaging planes and capture an image at each of the plurality of imaging planes within the working distance of an environment appearing within the field of view.

2. The imaging reader of claim 1, wherein the imaging reader is a handheld scanner.

3. The imaging reader of claim 1, wherein the imaging reader is a bioptic scanner.

4. The imaging reader of claim 1, wherein the variable focus imaging controller is configured to determine from one or more scanning parameters of the imaging reader at least one of (i) the number of the plurality of imaging planes over the working distance and/or (ii) a distance of each of the plurality of imaging planes from the image sensor.

5. The imaging reader of claim 4, wherein the one or more scanning parameters for the imaging reader comprises frame rate of the image sensor, exposure time of the image sensor, an aperture of the variable focus optical element, a swipe speed of movement of the target, a size of the working distance, a nearest distance of the working distance, a farthest distance of the working distance, and/or focusing time of the variable focus optical element.

6. The imaging reader of claim 4, wherein the one or more scanning parameters for the imaging reader comprises types and/or sizes of targets to be scanned.

7. The imaging reader of claim 4, wherein the variable focus imaging controller has a ranging mode in which the variable focus imaging assembly determines, based on the one or more scanning parameters, the number of the plurality of imaging planes and the distances of the plurality of imaging planes from the image sensor.

8. The imaging reader of claim 1, wherein the variable focus imaging controller is configured to control the variable focus imaging assembly to capture images at each of the imaging planes in a sequential ordered manner.

9. The imaging reader of claim 1, wherein the variable focus imaging controller is configured to control the variable focus imaging assembly to capture images at each of the imaging planes by using a focus sweeping operation on the variable focus optical element.

10. The imaging reader of claim 1, wherein the number of the plurality of imaging planes is less than or equal to 5.

11. The imaging reader of claim 1, wherein each of the plurality of imaging planes is spaced apart by a different spacing distance.

12. The imaging reader of claim 1, wherein the variable focus optical element comprises a deformable lens element.

13. The imaging reader of claim 1, wherein the variable focus imaging controller comprises a voice coil actuator motor for controlling the variable focus optical element.

14. The imaging reader of claim 1, wherein the variable focus optical element has an aperture from 1.5 mm to 3 mm.

15. The imaging reader of claim 1, wherein the variable focus imaging assembly is an auto-focus camera assembly.

16. The imaging reader of claim 1, wherein the light source is an omnidirectional light source.

17. The imaging reader of claim 1, wherein the imaging reader is a handheld imaging reader having a hands-on scanning mode and a hands-free scanning mode, and wherein the variable focus imaging controller is to determine when the imaging reader is in the hands-on scanning mode or in the hands-free scanning mode.

18. The imaging reader of claim 1, wherein the variable focus imaging controller is configured to consecutively cycle the variable focus imaging assembly to focus at each of the imaging planes and capture the image at each of the plurality of imaging planes, in response to the variable focus imaging controller determining that the imaging reader is in the hands-free scanning mode.

19. The imaging reader of claim 1, wherein the depth of field at each of the plurality of imaging planes varies.

20. The imaging reader of claim 1, further comprising an image processor to analyze the set of captured images and determine an indicia on the target.

* * * * *